United States Patent
Sapozhnikov et al.

(10) Patent No.: US 10,614,838 B2
(45) Date of Patent: Apr. 7, 2020

(54) READER WITH SIDE SHIELDS DECOUPLED FROM A TOP SHIELD

(71) Applicant: Seagate Technology LLC, Cupertino, CA (US)

(72) Inventors: Victor Sapozhnikov, Minnetonka, MN (US); Taras Grigorievich Pokhil, Arden Hills, MN (US); Mohammed Shariat Ullah Patwari, Edina, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 16/110,701

(22) Filed: Aug. 23, 2018

(65) Prior Publication Data

US 2020/0066301 A1 Feb. 27, 2020

(51) Int. Cl.
*G11B 5/39* (2006.01)
*G11B 5/11* (2006.01)

(52) U.S. Cl.
CPC .............. *G11B 5/3912* (2013.01); *G11B 5/11* (2013.01); *G11B 5/398* (2013.01); *G11B 5/3932* (2013.01)

(58) Field of Classification Search
None
See application file for complete search history.

(56) References Cited

U.S. PATENT DOCUMENTS

| | | | | |
|---|---|---|---|---|
| 6,980,403 B2* | 12/2005 | Hasegawa | .............. | B82Y 10/00 360/319 |
| 7,333,304 B2* | 2/2008 | Gill | .............. | B82Y 10/00 360/324.12 |
| 7,599,151 B2* | 10/2009 | Hatatani | .............. | B82Y 10/00 360/123.12 |
| 7,817,381 B2* | 10/2010 | Ohta | .............. | B82Y 10/00 360/319 |
| 8,437,106 B2* | 5/2013 | Yanagisawa | .............. | B82Y 25/00 360/319 |
| 8,537,505 B2 | 9/2013 | Shiimoto et al. | | |
| 8,630,068 B1* | 1/2014 | Mauri | .............. | G11B 5/3909 360/319 |
| 8,675,317 B2 | 3/2014 | Lin | | |
| 8,711,526 B2* | 4/2014 | Colak | .............. | G11B 5/3912 360/319 |
| 8,980,109 B1* | 3/2015 | Zhou | .............. | G11B 5/84 216/22 |
| 8,995,096 B2 | 3/2015 | McKinlay et al. | | |
| 9,019,664 B2 | 4/2015 | Song et al. | | |
| 9,030,782 B2* | 5/2015 | McKinlay | .............. | G11B 5/112 360/319 |
| 9,070,382 B2* | 6/2015 | Sapozhnikov | .............. | G11B 5/1278 |
| 9,076,468 B1 | 7/2015 | Keener et al. | | |
| 9,230,576 B1 | 1/2016 | Gill et al. | | |

(Continued)

*Primary Examiner* — William J Klimowicz
(74) *Attorney, Agent, or Firm* — Westman, Champlin & Koehler, P.A.

(57) ABSTRACT

A reader having a sensor stack and a top shield above the sensor stack. The top shield has an upper surface and a lower surface. The reader also includes at least one side shield below the top shield and adjacent to the sensor stack. The reader further includes a decoupling layer between the upper surface of the top shield and the at least one side shield. The decoupling layer is configured to decouple a first portion of the at least one side shield, proximate to the sensor stack, from at least a portion of the top shield.

11 Claims, 10 Drawing Sheets

(56) References Cited

U.S. PATENT DOCUMENTS

| | | | |
|---|---|---|---|
| 9,280,992 B1 | 3/2016 | Jiang et al. | |
| 9,390,735 B1* | 7/2016 | Wang | G11B 5/3912 |
| 9,437,224 B2 | 9/2016 | Singleton et al. | |
| 9,472,216 B1 | 10/2016 | Mauri et al. | |
| 9,922,672 B1 | 3/2018 | Mauri et al. | |
| 2005/0146813 A1 | 7/2005 | Oshima | |
| 2006/0092582 A1* | 5/2006 | Gill | B82Y 10/00 |
| | | | 360/324.12 |
| 2007/0115595 A1* | 5/2007 | Honda | B82Y 25/00 |
| | | | 360/320 |
| 2011/0007426 A1* | 1/2011 | Qiu | G11B 5/3932 |
| | | | 360/313 |
| 2012/0250189 A1* | 10/2012 | Degawa | G01R 33/093 |
| | | | 360/235.4 |
| 2014/0004385 A1* | 1/2014 | Colak | G11B 5/3912 |
| | | | 428/815 |
| 2014/0218825 A1* | 8/2014 | Sapozhnikov | G11B 5/1278 |
| | | | 360/235.4 |
| 2014/0268418 A1* | 9/2014 | McKinlay | G11B 5/112 |
| | | | 360/125.26 |
| 2015/0036246 A1* | 2/2015 | McNeill | G11B 5/11 |
| | | | 360/319 |
| 2015/0332712 A1* | 11/2015 | Isowaki | G11B 5/3912 |
| | | | 360/319 |
| 2017/0076741 A1* | 3/2017 | Tang | G11B 5/112 |

* cited by examiner

READER WITH SIDE SHIELDS DECOUPLED FROM A TOP SHIELD

SUMMARY

The present disclosure relates to read heads or readers having side shields that are decoupled from a top shield.

In one embodiment, a reader having a sensor stack and a top shield above the sensor stack is provided. The top shield has an upper surface and a lower surface. The reader also includes at least one side shield below the top shield and adjacent to the sensor stack. The reader further includes a decoupling layer between the upper surface of the top shield and the at least one side shield. The decoupling layer is configured to decouple a first portion of the at least one side shield, proximate to the sensor stack, from at least a portion of the top shield.

In another embodiment, a method of forming a reader is provided. The method includes forming a sensor stack, and forming a top shield above the sensor stack. The top shield has an upper surface and a lower surface. The method also includes forming at least one side shield below the top shield and adjacent to the sensor stack. A first portion of the at least one side shield, proximate to the sensor stack, is decoupled from at least a portion of the top shield.

In yet another embodiment, a reader is provided. The reader includes a sensor stack and a top shield above the sensor stack. The top shield has an upper surface and a lower surface. The reader also includes at least one side shield below the top shield and adjacent to the sensor stack. The at least one side shield has a first portion that is proximate to the sensor stack and a second portion that is away from the sensor stack. The second portion of the at least one side shield is coupled to the top shield. A decoupling layer is includes between the upper surface of the top shield and the first portion of the at least one side shield.

Other features and benefits that characterize embodiments of the disclosure will be apparent upon reading the following detailed description and review of the associated drawings.

DETAILED DESCRIPTION OF ILLUSTRATIVE EMBODIMENTS

Cross track resolution of a reader is characterized by MT10, which is a distance between two positions on opposite sides of a narrow track or micro track (MT) on a data storage medium at which a sensed signal strength decreases to 10% of its maximum. MT10/MT50 (MT50 being a distance between two positions on opposite sides of a MT on a data storage medium at which a signal strength decreases to 50% of its maximum) directly impacts an areal density capability of a data storage device such as a disc drive. Cross track resolution of the reader depends on magnetic characteristics of side shields of the reader. In certain embodiments, the softer the side shields, the better the reader resolution. Embodiments of the disclosure improve the softness of the side shields and thus improve MT10 and MT10/MT50. However, prior to providing additional details regarding the different embodiments, a description of an illustrative operating environment is provided below.

It should be noted that like reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Figure 1:
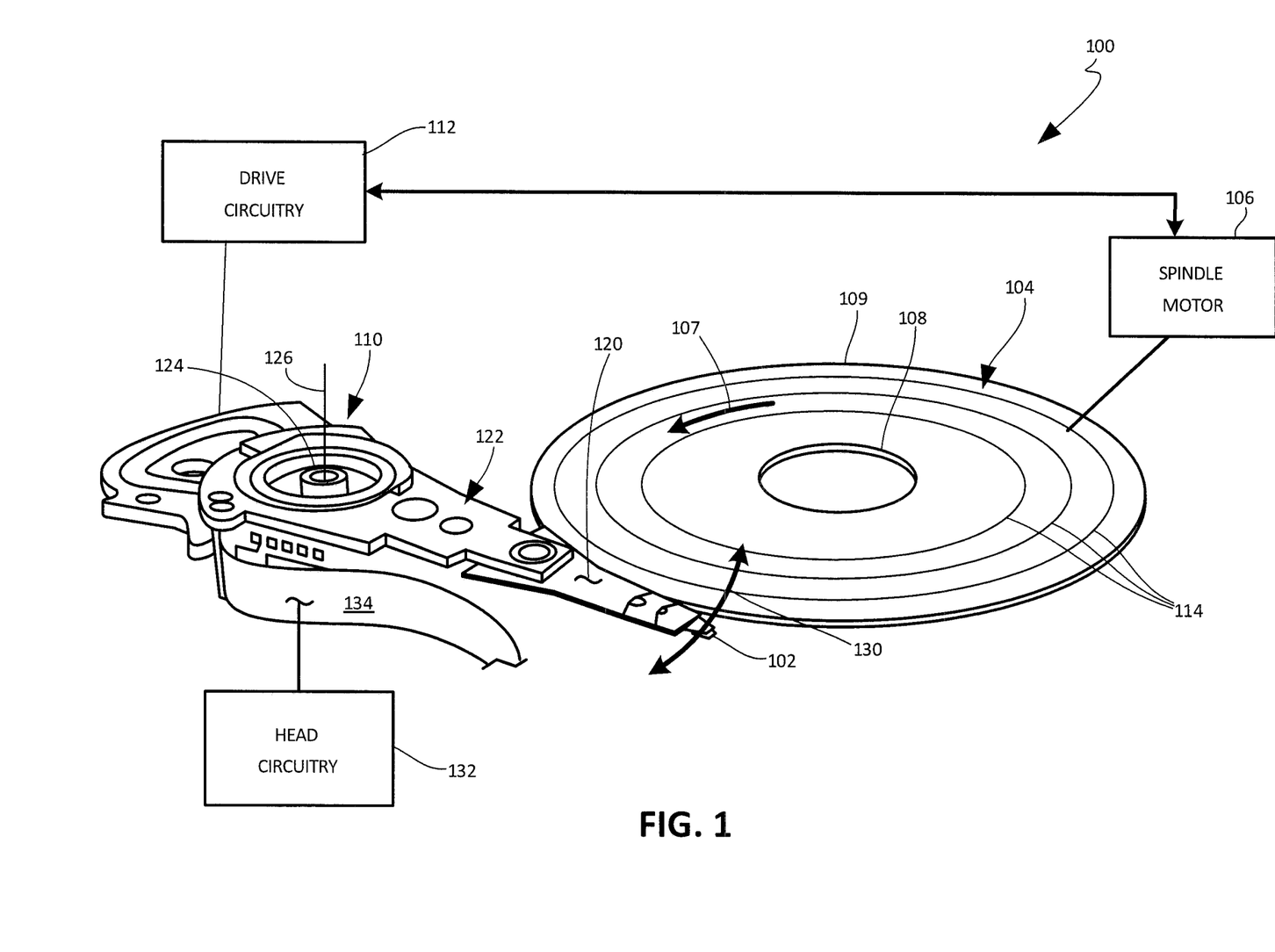
FIG. 1 is a schematic illustration of a data storage system including a data storage medium and a head for reading data from and/or writing data to the data storage medium.

FIG. 1 shows an illustrative operating environment in which certain specific embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments. It should be noted that the same reference numerals are used in different figures for same or similar elements.

FIG. 1 is a schematic illustration of a data storage device 100 including a data storage medium and a head for reading data from and/or writing data to the data storage medium. In data storage device 100, head 102 is positioned above storage medium 104 to read data from and/or write data to the data storage medium 104. In the embodiment shown, the data storage medium 104 is a rotatable disc or other magnetic storage medium that includes a magnetic storage layer or layers. For read and write operations, a spindle motor 106 (illustrated schematically) rotates the medium 104 as illustrated by arrow 107 and an actuator mechanism 110 positions the head 102 relative to data tracks 114 on the rotating medium 104 between an inner diameter 108 and an outer diameter 109. Both the spindle motor 106 and actuator mechanism 110 are connected to and operated through drive circuitry 112 (schematically shown). The head 102 is coupled to the actuator mechanism 110 through a suspension assembly which includes a load beam 120 connected to an actuator arm 122 of the mechanism 110 for example through a swage connection. Although FIG. 1 illustrates a single load beam coupled to the actuator mechanism 110, additional load beams 120 and heads 102 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 102 in a cross track direction as illustrated by arrow 130.

The head 102 includes one or more transducer elements (not shown in FIG. 1) coupled to head circuitry 132 through flex circuit 134. Details regarding elements of a head such as 102 are provided below in connection with FIG. 2.

Figure 2:
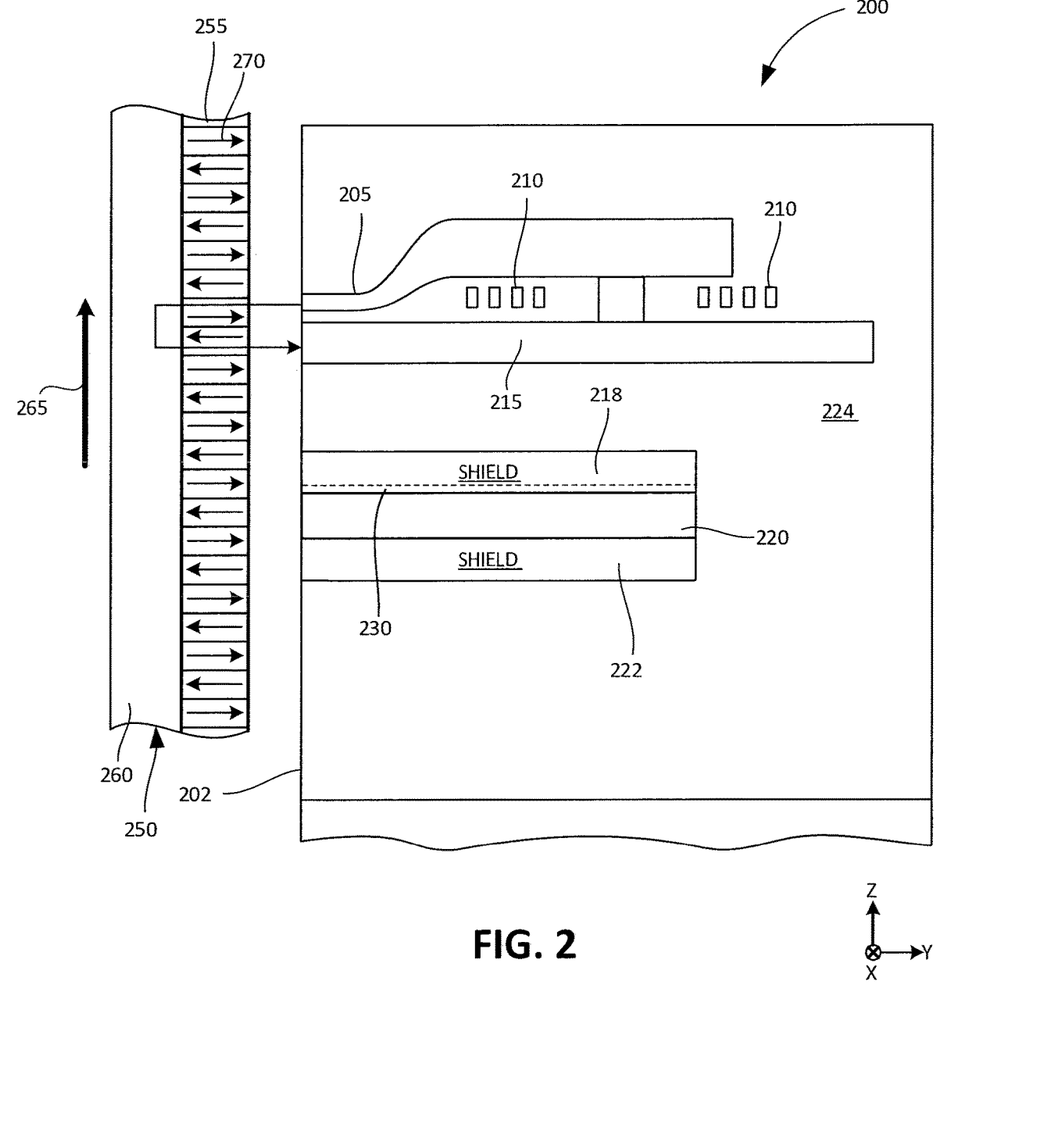
FIG. 2 is a schematic diagram of a cross-section of one embodiment of a recording head that reads from and writes to a storage medium.

FIG. 2 is a schematic diagram showing a cross-sectional view of portions of a recording head 200 and a data storage medium 250 taken along a plane substantially normal to a plane of a bearing surface (for example, an air bearing surface (ABS)) 202 of recording head 200. The recording head elements shown in FIG. 2 are illustratively included in a recording head such as recording head 102 in FIG. 1. Medium 250 is illustratively a data storage medium such as medium 104 in FIG. 1. Those skilled in the art will recognize that recording heads and recording media commonly include other components. Embodiments of the present disclosure are not limited to any particular recording heads or media. Embodiments of the present disclosure may be practiced in different types of recording heads and media.

Recording head 200 includes a write pole 205, a magnetization coil 210, a return pole 215, a top shield 218, a read transducer 220, a bottom shield 222 and a wafer overcoat 224. Storage medium 250 includes a recording layer 255 and an underlayer 260. Storage medium 250 rotates in the direction shown by arrow 265. Arrow 265 is illustratively a direction of rotation such as arrow 107 in FIG. 1.

In an embodiment, electric current is passed through coil 210 to generate a magnetic field. The magnetic field passes from write pole 205, through recording layer 255, into underlayer 260, and across to return pole 215. The magnetic field illustratively records a magnetization pattern 270 in recording layer 255. Read transducer 220 senses or detects magnetization patterns in recording layer 255, and is used in retrieving information previously recorded to layer 255.

As will be described in detail further below, read transducer 220 has multiple layers including a sensing layer or free layer. The layers of the read transducer 220 may be stacked along a track direction (e.g., a z-direction in FIG. 2) or a track width direction that is perpendicular to the track direction (e.g., a cross-track direction, which is an x-direction in FIG. 2). A y-direction in FIG. 2 is then defined as a direction that is perpendicular to x and z simultaneously, which is a stripe-height direction. As indicated earlier, side shields (not shown in FIG. 2) are also included on either side of read transducer 220. Also, as noted above, embodiments of the disclosure improve the softness of the side shields and thus improve MT10 and MT10/MT50. In different embodiments, which are described further below in connection with FIGS. 3A-6B, the side shields are completely or partially decoupled form the top shield 218 or from an upper part of the top shield 218. Element 230 (shown with dashed lines in FIG. 2) represents a decoupling layer that is positioned to decouple the side shields (not shown in FIG. 2) from the top shield 218. Complete or partial decoupling the side shields from the top shield 218 makes the side shields softer, which improves their shielding characteristics and thus improves cross track resolution of the reader.

Figure 3A:
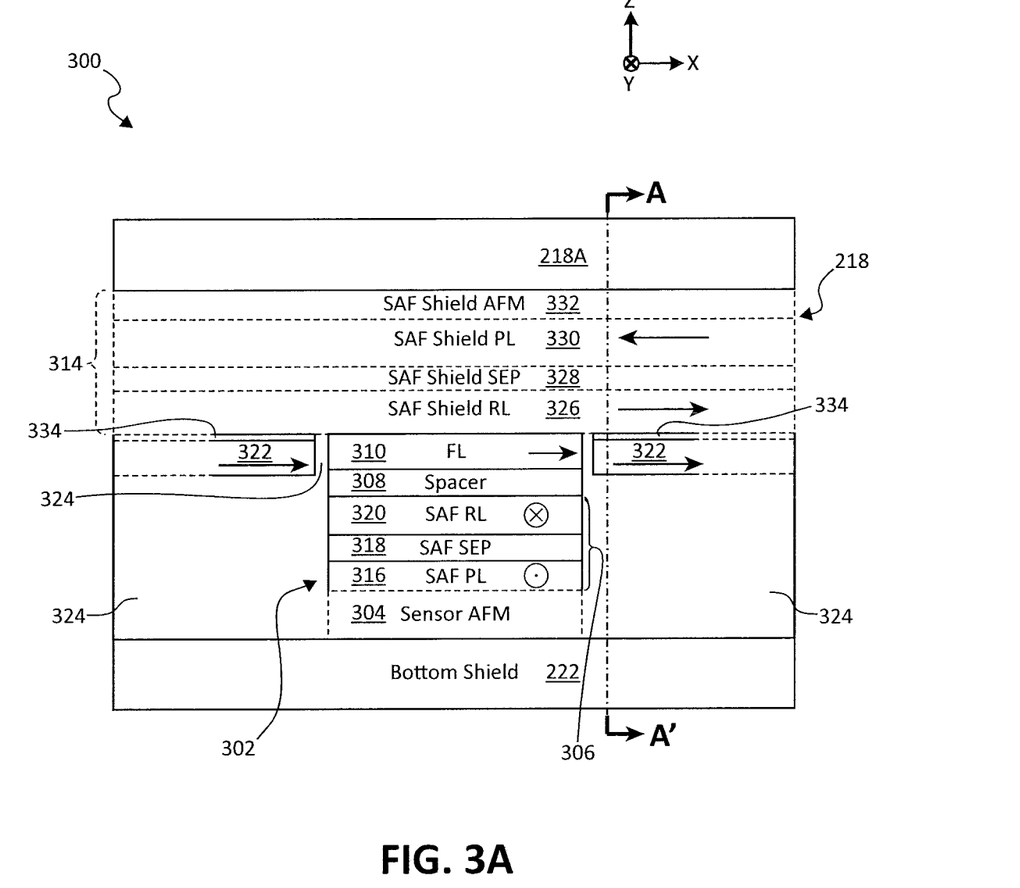
FIG. 3A is a bearing surface view of a read head in accordance with one embodiment.

FIG. 3A is a schematic block diagram showing a bearing surface view of a read head 300 including side shields that are at least partially decoupled in accordance with one embodiment. Read head 300 includes a magnetoresistive sensor 302 that is positioned between top shield 218 and bottom shield 222. Top and bottom shields 218 and 222, which may include a material having high magnetic permeability, reduce or substantially block extraneous magnetic fields, such as, for example, those from adjacent bits on data discs from impacting the magnetoresistive sensor 302, thus improving the performance of the magnetoresistive sensor 302. In one implementation, the top and bottom shields 218 and 222 permit magnetic fields from the bit directly under magnetoresistive sensor 302 to affect the magnetoresistive sensor 302, and thus be read.

The magnetoresistive sensor 302 includes a plurality of layers including a sensor stack synthetic antiferromagnetic (SAF) structure 306, a spacer layer 308 and a free layer or sensing layer 310. In certain embodiments (not shown), free layer 310 may be a multi-layered structure. A stack cap layer (not shown) may also be included above the free layer. A sensor antiferromagnetic (AFM) layer 304 may optionally be included in some embodiments. Also, an SAF shielding structure 314 may optionally be included above the free layer 310 (or above the stack cap layer (not shown)). Thus, top shield 218 may include a single pinned layer 218A or may include multi-layered SAF structure 314. Dashed lines are used to represent elements within structure 314 to indicate that structure 314 is optional. Also, dashed lines are used to indicate that AFM layer 304 is optional.

In the embodiment shown in FIG. 3A, the sensor SAF structure 306 includes a pinned layer 316 a thin separation layer 318, which may comprise a metal such as ruthenium (Ru) in some embodiments, and a reference layer 320. The magnetic moments of each of the pinned layer 316 and the reference layer 320 are not allowed to rotate under magnetic fields in the range of interest (for example, magnetic fields generated by the bits of data stored on the data discs). The magnetic moments of the reference layer 320 and the pinned layer 316 are generally oriented normal to the plane (e.g., the y direction) of FIG. 3A and anti-parallel to each other.

The magnetic moment of the free layer 310 is free to rotate under the influence of an applied magnetic field in a range of interest. The read head 300 further includes side shields 322, which reduce or substantially block extraneous magnetic fields, such as, for example, those from bits on adjacent tracks from impacting the magnetoresistive sensor 302. Further, side shields 322 may produce a magnetic field that biases the free layer 310 with a magnetic moment parallel to the plane of the figure and generally oriented horizontally. The bias is sufficiently small, however, that the magnetic moment of the free layer 310 can change in response to an applied magnetic field, such as a magnetic field of a data bit stored on the data discs. In some embodiments, the side shields 322 are formed of soft magnetic material (e.g., material that can be easily magnetized and demagnetized at relatively low magnetic fields). The soft magnetic material may be an alloy comprising Ni and Fe. The magnetoresistive sensor 302 is separated and electrically isolated from the side shields 322 by an isolation layer 324 including, for example, insulating materials. Isolation layer 324 may also be present in other regions of head 300 as shown in FIG. 3A.

In the embodiment shown in FIG. 3A, optional SAF shielding structure 314 includes a SAF shield reference layer 326, a thin SAF shield separation layer 328, which may comprise a metal such as Ru in some embodiments, a SAF shield pinned layer 330 and a SAF shield AFM layer 332. In some embodiments, SAF shield reference layer 326 may have a relatively fixed magnetization to assist in stabilizing the magnetizations of side shields 322. Thus, AFM layer 332 pins the magnetization of layer SAF shield pinned layer 330 substantially parallel to the bearing surface, which results in the relatively fixed magnetization of SAF shield reference layer 326 due to antiferromagnetic coupling across SAF shield separation layer 328 and thus in stabilizing the magnetizations of the side shields 322 substantially parallel to the bearing surface as well. SAF shield reference layer 326 and SAF shield pinned layer 330 may be formed of a soft magnetic material (for example, an alloy comprising Ni and Fe).

As noted above, side shields 322 are at least partially decoupled from top shield 218. Accordingly, a decoupling layer 334 is included between the top shield 218 and the side shield 322. The dashed portions in decoupling layer 334 indicate that the layer 334 may or may not be present in those portions between side shields 322 and top shield 218.

Figure 3B:
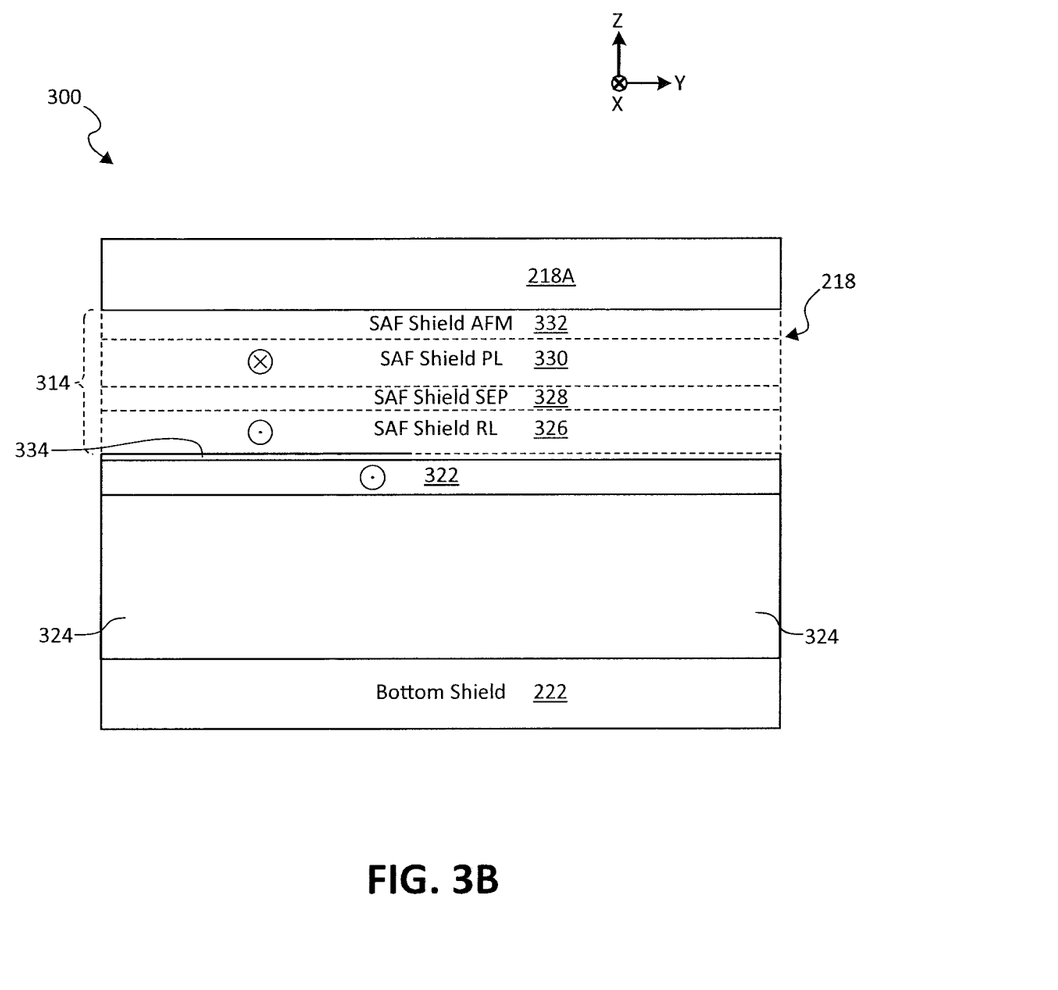
FIG. 3B is a cross-sectional view of the read head of FIG. 3A.

FIG. 3B illustrates a sectional side view of read head 300 taken along section AA', which shows decoupling layer 334 behind the bearing surface. As can be seen in FIG. 3B, a stripe height of the decoupling layer 334 may be different in different embodiments as shown by the rear dashed portion of layer 334. Thus, in different embodiments, the top shield 218 may be either partially of completely decoupled from the side shield 322 in the stripe height direction.

Decoupling layer 334 may be formed of, for example, ruthenium or tantalum and may be about 2 nm thick in order to achieve decoupling in some embodiments. It should be noted that, in certain embodiments, layer 334 may be greater than 2 nm to achieve proper decoupling. Further, in some embodiments, layer 334 may be less than 2 nm. In such embodiments, a level of decoupling may be reduced, but stability of the side shield 322 magnetization may be improved.

Referring back to FIG. 3A, in some embodiments, sensor 302 may utilize tunnel magnetoresistance (TMR) or giant magnetoresistance (GMR) effects. In embodiments that utilize TMR effects, spacer layer 308 is a tunneling barrier layer that separates the SAF structure 306 from the free layer 310. The tunneling barrier layer 308 is sufficiently thin that quantum mechanical electron tunneling occurs between a reference layer 320 in the SAF structure 306 and the free layer 310. The electron tunneling is electron-spin dependent, making the magnetic response of the magnetoresistive sensor 302 a function of the relative orientations and spin polarizations of the SAF structure 306 and the free layer 310. The highest probability of electron tunneling occurs when the magnetic moments of the SAF structure 306 and the free layer 310 are parallel, and the lowest probability of electron tunneling occurs when the magnetic moments of the SAF structure 306 and the free layer 310 are antiparallel. Accordingly, the electrical resistance of the magnetoresistive sensor 302 changes in response to an applied magnetic field. The data bits on the data discs in the disc drive may be magnetized in a direction normal to the plane of FIG. 3A, either into the plane of the figure, or out of the plane of the figure. Thus, when the magnetoresistive sensor 302 passes over a data bit, the magnetic moment of the free layer 310 is rotated either into the plane of FIG. 3A or out of the plane of FIG. 3A, changing the electrical resistance of the magnetoresistive sensor 302. The value of the bit being sensed by the magnetoresistive sensor 302 (for example, either 1 or 0) may therefore be determined based on the current flowing from a first electrode (not shown) to a second electrode (not shown) connected to the magnetoresistive sensor 302.

Figure 4A:
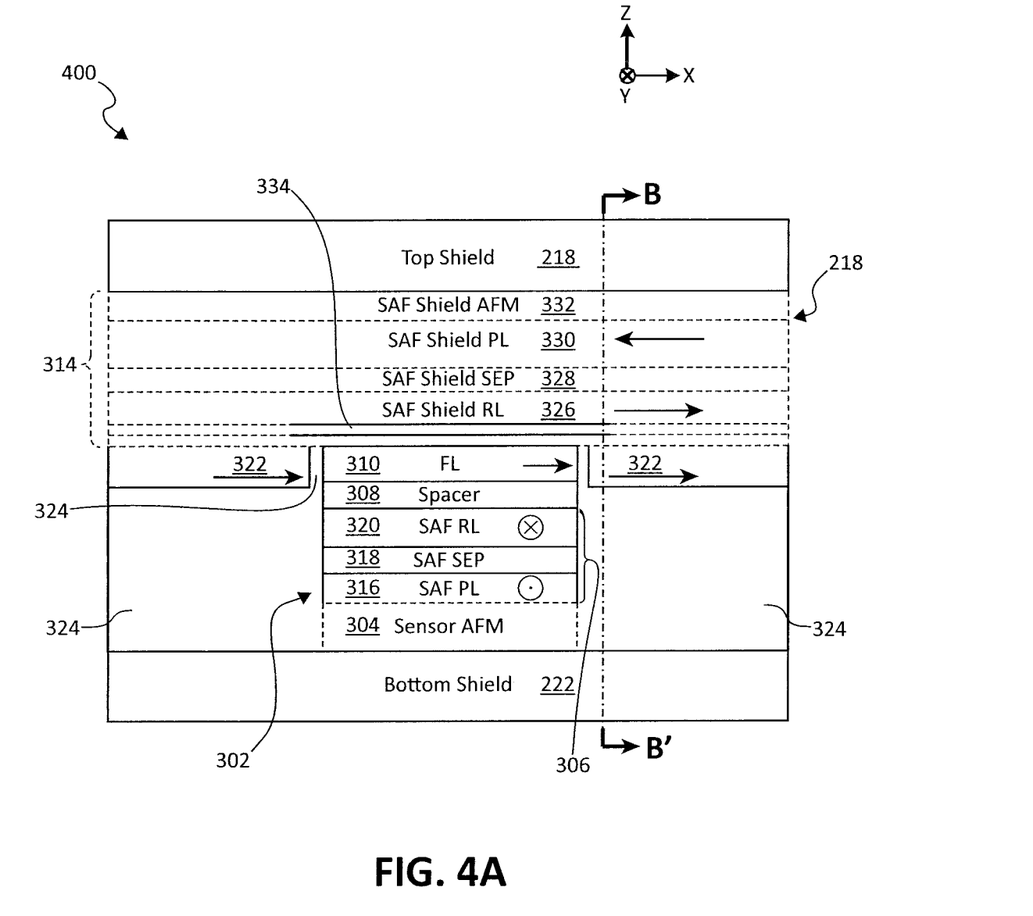
FIG. 4A is a bearing surface view of a read head in accordance with another embodiment.
Figure 4B:
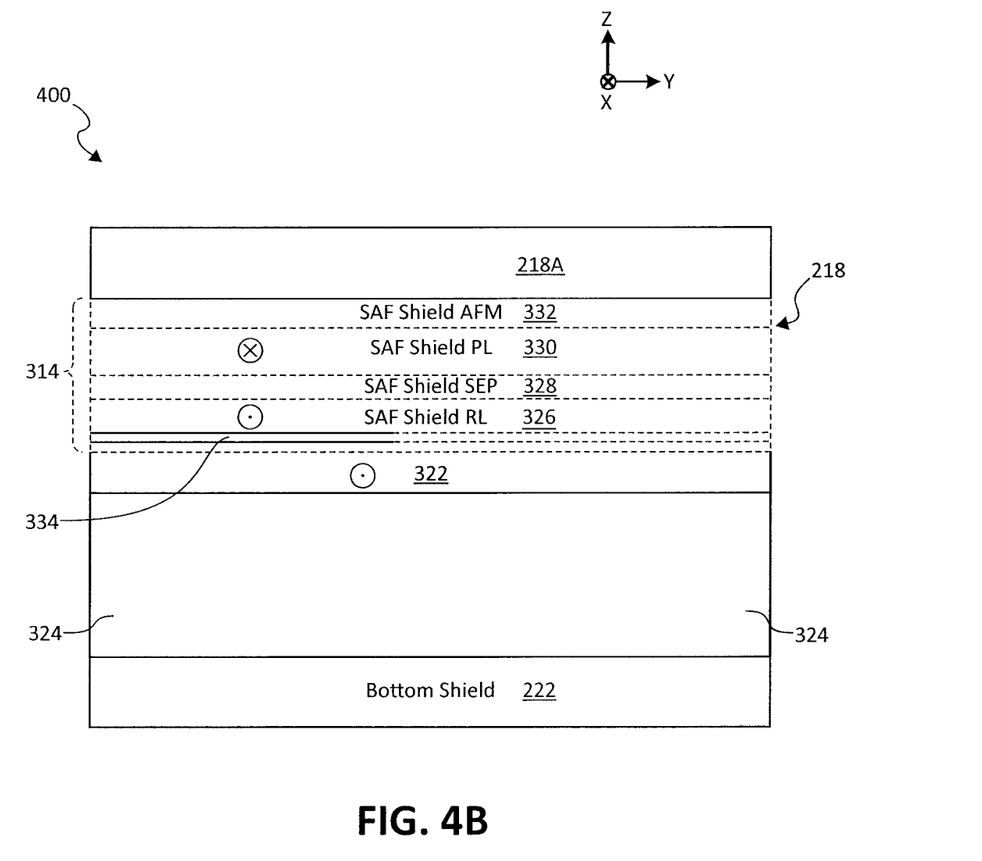
FIG. 4B is a cross-sectional view of the read head of FIG. 4A.

FIG. 4A is a schematic block diagram showing a bearing surface view of a read head 400 including side shields that are at least partially decoupled from an upper portion of the top shield in accordance with one embodiment. The elements of read head 400 are substantially similar to the elements of read head 300 of FIGS. 3A and 3B and therefore same or like reference numerals are used in FIG. 4A for the same or similar elements. Read head 400 differs for read head 300 (of FIGS. 3A and 3B) in that decoupling layer 334 is positioned within top shield 218 (e.g., within SAF shield reference layer 326) such that side shields 322 and a relatively thin lower part of the top shield 218 are partially or completely decoupled from the remainder of the top shield 218. FIG. 4B illustrates a sectional side view of read head 400 taken along section BB', which shows decoupling layer 334 behind the bearing surface. As can be seen in FIG. 4B, a stripe height of the decoupling layer 334 may be different in different embodiments as shown by the rear dashed portion of layer 334. Thus, in different embodiments, side shields 322 and the relatively thin lower part of the top shield 218 are partially or completely decoupled from the remainder of the top shield 218 in the stripe height direction.

Figure 5A:
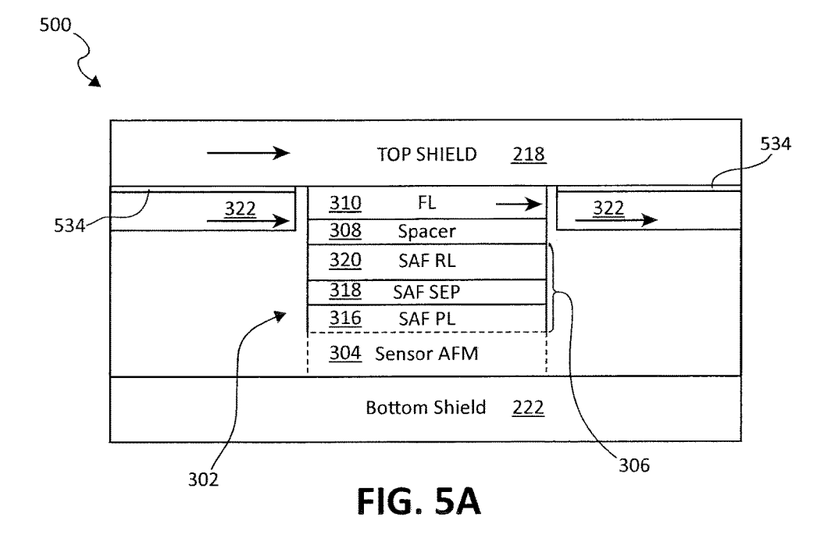
FIGS. 5A, 5B, 6A and 6B are bearing surface views of still other read head embodiments.
Figure 5B:
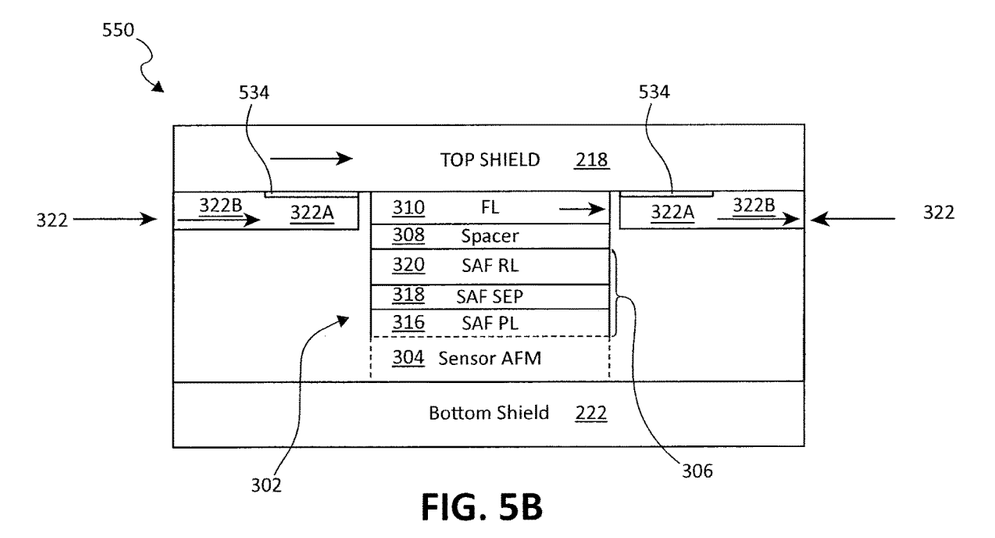

FIGS. 5A, 5B, 6A and 6B illustrate read head embodiments in which no SAF structure is included in the top shield. FIG. 5A illustrates a read head 500 embodiment in which side shields 322 are completely decoupled from top shield 218. Thus, decoupling layer 534 completely separates the top shield 218 from the side shields 322. FIG. 5B illustrates a read head 550 embodiment in which side shields 322 are partially decoupled from top shield 218. In read head 550, decoupling layer 534 is included only in a vicinity of a junction of the side shield 322 and the sensor stack including free layer 310. Thus, a first portion 322A of the side shield 322 is decoupled from the top shield 218 and a second portion 322B of the side shield 322 is coupled to the top shield 218.

Figure 6A:
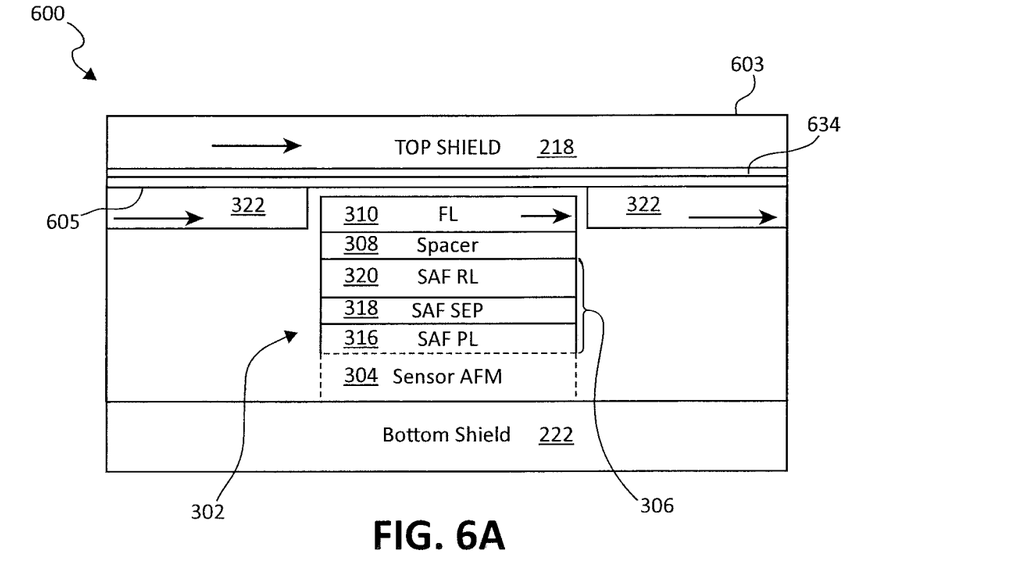
Figure 6B:
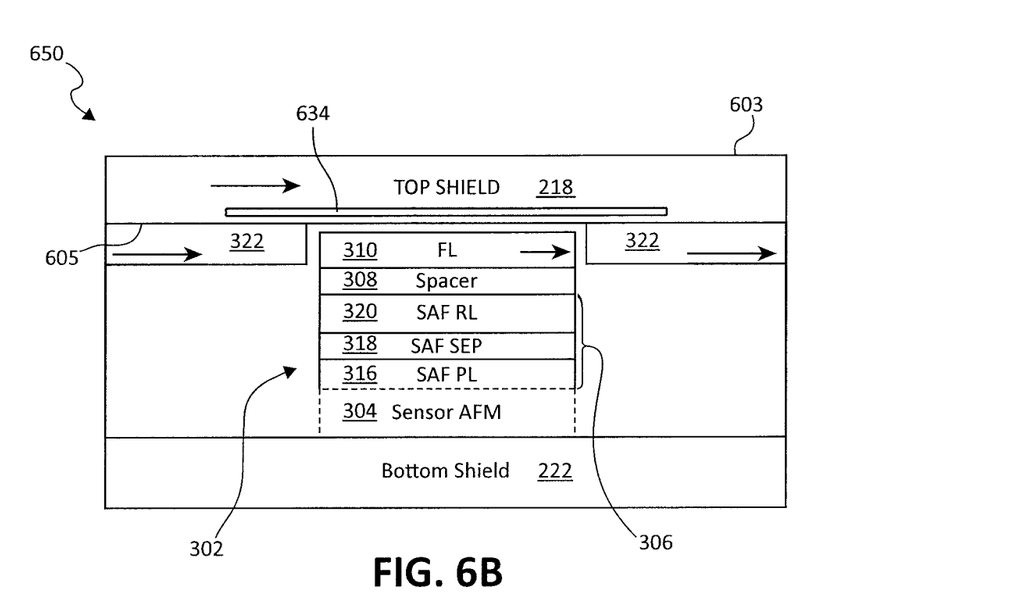

FIG. 6A illustrates a read head 600 embodiment in which side shields 322 and a substantially thin lower part of the top shield 218 are completely decoupled from the remaining part of the top shield 218 by decoupling layer 634. Accordingly, in read head 600, decoupling layer 634 is between an upper surface 603 of the top shield 218 and a lower surface 605 of the top shield 218. FIG. 6B illustrates a read head 650 embodiment in which side shields 322 and a substantially thin lower part of the top shield 218 are partially decoupled from the remaining part of the top shield 218 by decoupling layer 634. Thus, in read head 650, decoupling layer 634 is included only in a vicinity of a junction of the side shield 322 and the sensor stack 302.

Figure 7:
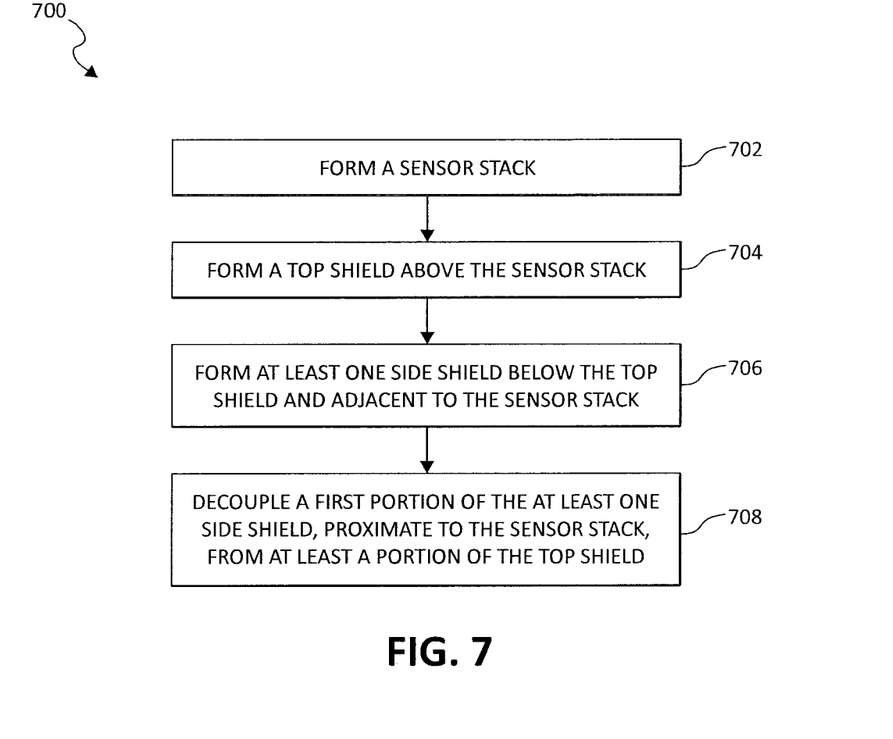
FIG. 7 is a flow diagram of a method embodiment.

FIG. 7 is a flow diagram of a method 700 embodiment. The method includes, at block 702, forming a sensor stack. At block 704, a top shield is formed above the sensor stack. The top shield has an upper surface and a lower surface. The method also include, at block 706, forming at least one side shield below the top shield and adjacent to the sensor stack. The method further includes, at block 708, decoupling a first portion of the at least one side shield, proximate to the sensor stack, from at least a portion of the top shield.

In some of embodiments described above, width and/or stripe height dimensions of the decoupling layer may be different from the width and/or stripe height dimensions of the top shield and/or the side shields. In such embodiments, masks may be employed to implement the desired structures.

Figure 8A:
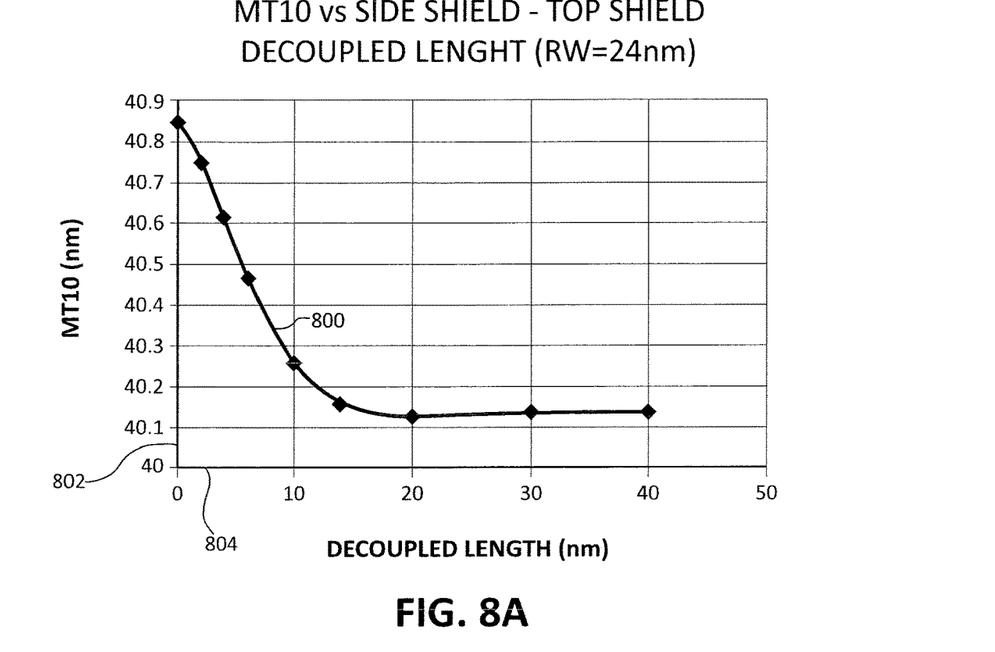
FIGS. 8A and 8B are plots of results obtained using a reader of the type shown in any one of FIGS. 3A-6B.
Figure 8B:
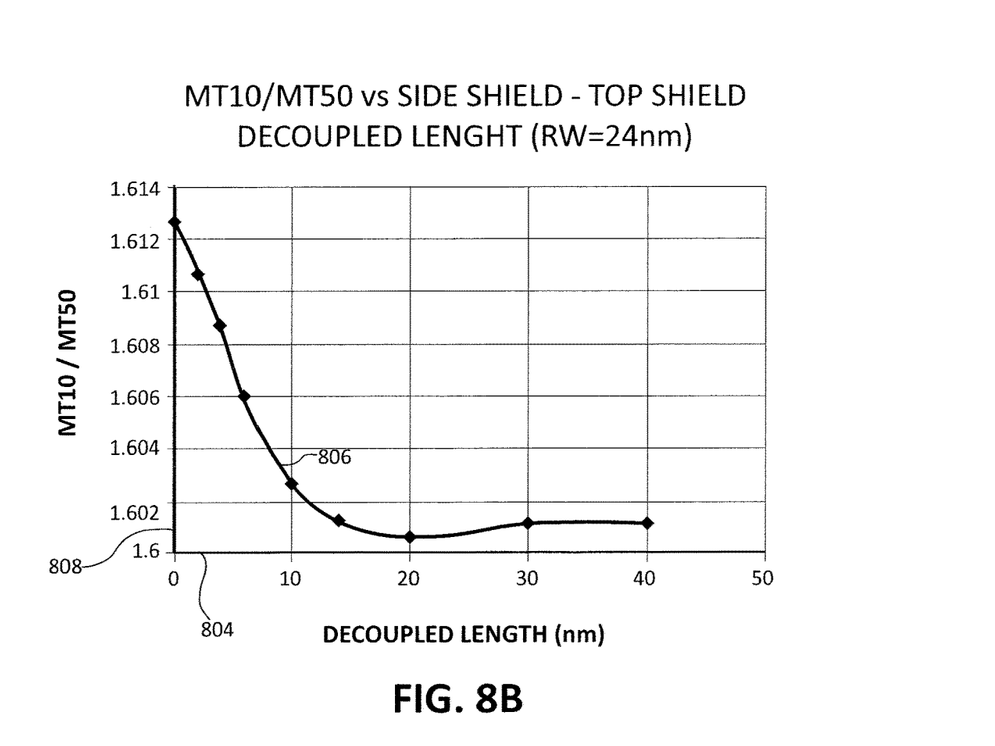

FIG. 8A is a MT10 versus side shield-top shield decoupling length plot 800 for a read head having a reader width of 24 nm. In FIG. 8A, a vertical axis 802 represents MT10 in nm and a horizontal axis 804 represents decoupling length in nm. FIG. 8B is a MT10/MT50 versus side shield-top shield decoupling length plot 806 for a read head having a reader width of 24 nm. In FIG. 8A, a vertical axis 808 represents MT10/MT50 the horizontal axis 804 is the same as in FIG. 8A. As can be seen in the example of FIGS. 8A and 8B, for side shields decoupled at the junction of the side shields and the sensor stack, a full gain is achieved at 20 nm decoupling length. Thus, the embodiments described above provide an improvement in cross track resolution of the reader, which improves the areal density capability of the data storage device (e.g., disc drive).

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A reader comprising:
   a sensor stack;
   a top shield above the sensor stack, the top shield having an upper surface and a lower surface;
   at least one side shield below the top shield and adjacent to the sensor stack;
   a decoupling layer between the lower surface of the top shield and the at least one side shield, the decoupling layer configured to decouple a first portion of the at least one side shield, proximate to the sensor stack, from at least a portion of the top shield;
   an insulating layer between the decoupling layer and the sensor stack; and wherein a second portion of the at least one side shield that is away from the sensor stack is coupled to the top shield.

2. The reader of claim 1 and wherein the top shield comprises a synthetic antiferromagnetic (SAF) structure.

3. The reader of claim 1 and wherein a stripe height of the decoupling layer is greater than zero and less than a stripe height of the top shield and less than a stripe height of the at least one side shield, thereby partially decoupling the top shield from the at least one side shield in a stripe height direction.

4. The reader of claim 1 and wherein a stripe height of the decoupling layer is substantially equal to a stripe height of the top shield or a stripe height of the at least one side shield, thereby substantially completely decoupling the top shield from the at least one side shield in a stripe height direction.

5. A method of forming a reader comprising:
   forming a sensor stack;
   forming a top shield above the sensor stack, the top shield having an upper surface and a lower surface;
   forming at least one side shield below the top shield and adjacent to the sensor stack;
   decoupling a first portion of the at least one side shield, proximate to the sensor stack, from at least a portion of the top shield by forming a decoupling layer between the lower surface of the top shield and the at least one side shield;
   forming an insulating layer between the decoupling layer and the sensor stack; and further comprising coupling a second portion of the at least one side shield, which is away from the sensor stack, to the top shield.

6. The method of claim 5 and wherein the decoupling layer is formed with a stripe height that is greater than zero and less than a stripe height of the top shield and less than a stripe height of the at least one side shield.

7. The method of claim 5 and wherein the decoupling layer is formed with a stripe height that is substantially equal to a stripe height of the top shield or a stripe height of the at least one side shield.

8. A reader comprising:
   a sensor stack;
   a top shield above the sensor stack, the top shield having an upper surface and a lower surface; and
   at least one side shield below the top shield and adjacent to the sensor stack, the at least one side shield having a first portion that is proximate to the sensor stack and a second portion that is away from the sensor stack, the second portion being coupled to the top shield;
   a decoupling layer between the lower surface of the top shield and the first portion of the at least one side shield; and
   an insulating layer between the decoupling layer and the sensor slack.

9. The reader of claim 8 and wherein the top shield comprises a synthetic antiferromagnetic (SAF) structure.

10. The reader of claim 8 and wherein a stripe height of the decoupling layer is greater than zero and less than a stripe height of the top shield and less than a stripe height of the at least one side shield, thereby partially decoupling the top shield from the at least one side shield in a stripe height direction.

11. The reader of claim 8 and wherein a stripe height of the decoupling layer is substantially equal to a stripe height of the top shield or a stripe height of the at least one side shield, thereby substantially completely decoupling the top shield from the at least one side shield in a stripe height direction.

\* \* \* \* \*

UNITED STATES PATENT AND TRADEMARK OFFICE
CERTIFICATE OF CORRECTION

PATENT NO. : 10,614,838 B2
APPLICATION NO. : 16/110701
DATED : April 7, 2020
INVENTOR(S) : Victor Sapozhnikov et al.

Page 1 of 1

It is certified that error appears in the above-identified patent and that said Letters Patent is hereby corrected as shown below:

In the Claims

In Column 8, Line 66, change "slack" to --stack--.

Signed and Sealed this
Sixteenth Day of June, 2020

Andrei Iancu
*Director of the United States Patent and Trademark Office*